United States Patent [19]

Rao et al.

[11] 3,925,568

[45] Dec. 9, 1975

[54] PROCESS FOR FORTIFYING FOOD AND FEED PRODUCTS WITH AMINO ACIDS

[75] Inventors: Ganta V. Rao; Oliver B. Gerrish, Sr., both of Hutchinson, Kans.

[73] Assignee: Far-Mar-Co., Inc, Hutchinson, Kans.

[22] Filed: Feb. 6, 1974

[21] Appl. No.: 439,860

Related U.S. Application Data

[63] Continuation-in-part of Ser. No. 291,341, Sept. 22, 1972, abandoned.

[52] U.S. Cl. .............. 426/618; 426/623; 426/630; 426/634; 426/656
[51] Int. Cl.² .......................................... A23L 1/20
[58] Field of Search .......... 426/208, 212, 377, 331, 426/355, 364, 342

[56] References Cited
UNITED STATES PATENTS

| | | |
|---|---|---|
| 3,617,303 | 11/1971 | Gearts ........................... 426/355 |
| 3,620,762 | 11/1971 | Yoshida et al .................. 426/208 X |
| 3,623,886 | 11/1971 | Mitsuda ........................... 426/208 |

*Primary Examiner*—Raymond N. Jones
*Attorney, Agent, or Firm*—Clarence A. O'Brien; Harvey B. Jacobson

[57] ABSTRACT

Vegetable protein containing foods, food products and/or feeds may be fortified with amino acids according to a process which includes tempering the foods, food products and/or feeds in an alkaline catalyst containing solution having a pH in the range from about 8.0–14 in the presence of the amino acids and at temperatures ranging from room temperature up to about 300°F. By this process, the food, food product and/or feed can be fortified with 0.05 – 25 percent of its weight of amino acids.

21 Claims, No Drawings

PROCESS FOR FORTIFYING FOOD AND FEED PRODUCTS WITH AMINO ACIDS

CROSS-REFERENCE TO OTHER APPLICATIONS

This is a continuation-in-part of copending application Ser. No. 291,341, filed Sept. 22, 1972, now abandoned.

BACKGROUND OF THE INVENTION

1. Field of the Invention

The present invention relates to fortification of vegetable protein containing food, food products and/or feed, and more particularly, to amino acid fortification thereof.

2. Description of the Prior Art

Presently, in view of the limited resources of high quality proteins, it is desirable to find new nutritive protein sources. The utilization of amino acids as food additives into basic vegetable foods is a logical way to economically and effectively provide additional protein.

Protein is a necessary nutrient for body growth. There are two kinds of proteins — animal and vegetable proteins. Generally speaking, animal protein foods, such as eggs, meat, milk, and the like, show high amino acid content and are nutritionally well-balanced. On the other hand, vegetable protein foods, such as rice, wheat, soy, potatoes, and the like, are not nutritionally well-balanced, i.e., they are deficient in some of the amino acids essential to animal and human nutrition.

When vegetable protein containing diets are sufficiently varied and contain adequate amounts of meat and dairy products, this deficiency in the quality of vegetable protein is of little, if any, significance. However, an all vegetable protein diet, such as an all-wheat diet, is likely to be deficient in amino acids, such as lysine, threonine and methionine.

Therefore, the fortification of vegetable protein foods, such as wheat and wheat products, with essential amino acids is necessary for optimum nutrition. Indeed, it has been determined that wheat products fortified with essential amino acids, such as lysine, can be compared favorably with soya protein concentrates and other high quality protein supplements.

A number of conventional processes exist for addition of amino acids, such as lysine-hydrochloride, to food products, such as wheat. For example, one such process teaches spraying a solution of about 0.1 – 0.2 percent lysine-hydrochloride onto wheat. Another such process applies lysine-hydrochloride to the food product by dusting as a very finely divided powder. Still another process contemplates passing the wheat through a pearling mill to lightly scarify the bran and then infusing the amino acid into the scarified wheat. While each of these processes are reasonably functional to the extent of applying lysine to the surface of the wheat product, it has been found that on washing or cooking the wheat prior to or during processing almost all of the lysine fortification is lost.

Another problem encountered with conventional fortification processes, which physically add the amino acids to the food products, is that certain amino acids, notably methionine, impart an undesirable flavor or aftertaste to the products. Even at very low levels of added amino acid, this undesirable taste is apparent and detracts significantly from the palatability of the fortified product.

SUMMARY OF THE INVENTION

It is, therefore, an object of the present invention to provide a process for fortifying vegetable protein containing food, food products and/or feed with amino acids in such a manner that the fortification will not be lost during subsequent processing, such as by conventional water wash.

It is another object of the invention to provide a process for fortifying vegetable protein with amino acids in such a manner that food products made therefrom do not exhibit the characteristic undesirable flavor of the amino acids.

It is yet another object of this invention to provide a process for fortifying vegetable protein which permits the incorporation of up to 20% by weight amino acid into the protein food, food product and/or feed.

It is still another object of this invention to provide a process for fortifying vegetable protein by use of a tempering solvent which transports the amino acids into the reactive sites of the endosperm through the tough bran layers and which effects a bonding between the protein and the amino acid, as contrasted with a physical association.

It is another object of the invention to provide an amino acid fortified vegetable protein food product for human or animal consumption which retains its fortification during processing and which does not exhibit the characteristic undesirable taste of the fortifying amino acid.

Other objects and advantages will become apparent from the following description and appended claims.

Briefly stated, in accordance with the aforesaid objects, the present invention provides a process for fortifying vegetable proteins with amino acids comprising the steps of tempering the vegetable protein in an aqueous solution having a pH range from about 8.0 – 14 and containing an alkaline catalyst and amino acid in an amount sufficient to achieve the desired fortification. Tempering is accomplished at a temperature in the range from about room temperature up to about 300°F. for a time sufficient, depending upon the temperature, to achieve the desired fortification. Following tempering, the fortified vegetable protein is dried, such as by air drying and/or mild heating, to reduce the moisture level thereof, to improve handling and storage characteristics and to stop microbial growth due to excess moisture. The preferred alkaline catalyst is a mild amine type catalyst, such as ammonium hydroxide.

DETAILED DESCRIPTION OF THE INVENTION

The present invention is directed to a process for fortification of vegetable protein containing foods, food products and/or feed with amino acids in an alkaline environment at room or elevated temperatures. The process can be used to fortify virtually any food, food product and/or feed; for example, wheat, wheat flour, wheat gluten, soya products, rice, rice flour, corn, corn products, grain sorghum, grain sorghum products, and the like. However, to simplify the following description, the process will be described in connection with the fortification of a representative food; namely, the whole wheat kernel along with selected soya products. It will be appreciated, however, that the process herein disclosed is equally applicable to any vegetable protein containing food, food product and/or feed.

In like manner, the fortification process may be practiced with any of the known amino acids or mixtures thereof. Amino acids fall generally into two categories, essential and non-essential. Essential amino acids are those which cannot be synthesized by the body and are necessary for survival. Non-essential amino acids can be synthesized by the body in adequate quantities and, therefore, are not essential constituents of human or animal diets. For this reason, food products are generally fortified only with the essential amino acids, although it will be appreciated that non-essential amino acids can also be used in accordance with the present process. The essential amino acids include lysine, methionine, leucine, isoleucine, valine, threonine, phenylalanine and tryptophan. For simplicity of description, the present process will be described using lysine as the fortifying amino acid; although, it will be appreciated that the process is equally applicable with all the aforementioned essential and non-essential amino acids as well as with mixtures thereof. It will also be appreciated that cereal grains are most deficient in lysine and, therefore, lysine is the essential amino acid most frequently used for fortification.

The present process involves partially reacting and transporting lysine, at alkaline pH, into the protein moiety of the wheat kernel. By this technique, fortification can be achieved from 0.05 to 20 percent lysine by weight of the wheat or wheat product. It has been found that products fortified by the present process show no visible evidence of fortification, such as a white external coating, and, more importantly, the lysine added in accordance with the present process is not substantially reduced by washing.

According to the present process, a tempering solvent is employed to transport the lysine to the reactive sites of the endosperm of the whole wheat kernel. Concentration of the lysine and pH of the solvent are two of the more important factors in achieving a predetermined degree of fortification. To fortify at nutritive levels, temperature of the solvent, tempering time and extent of agitation are secondary considerations since variations in these factors appear to primarily influence the speed of the fortification process rather than its extent or efficiency.

The tempering solvent is an aqueous solution of the amino acid to by fortified, such as lysine-hydrochloride, including an amount of alkaline catalyst sufficient to maintain the solvent pH in the range of from about 8.0 to 14. Tempering in neutral pH, such as in water solution, can only coat the lysine onto the bran. In such case, little, if any, of the lysine is transported into the endosperm. Preferably, the alkaline catalyst is a mild base amine type catalyst such as ammonium hydroxide. However, other basic catalysts are suitable for encouraging the fortification process, including strong bases, such as sodium hydroxide, potassium hydroxide, sodium carbonate, sodium bicarbonate, and the like. The problem associated with strongly basic catalysts is that they appear to adversely affect the protein and starch in the endosperm. Specifically, after fortification and drying of the wheat kernel, these strong catalysts will accumulate in the endosperm and render the fortified product unpalatable. On the other hand, a mild amine type basic catalyst, such as ammonium hydroxide, can be readliy evaporated without leaving any residue in the endosperm.

The pH of the tempering solvent is perhaps the most critical variable. As has previously been indicated, at a pH of about 7 no transportation into the endosperm appear to take place with the result that the amino acid accumulates as a coating on the outer surface of the kernel. As the pH becomes more alkaline, transportation is encourged until, at about a pH of 8, it has become a sufficiently important mechanism that fortification of the endosperm itself — as contrasted with a water-removable coating on the kernel — is significant. The extent of transportation of the amino acids through the bran layer into the endosperm increases with increasing pH and at pH's of 12 and above, virtually all fortification is into the endosperm. Accordingly, the preferred pH range for amino acid fortification according to the present process is 12 - 14. It will be appreciated, however, that considerations other than extent of fortification may dictate fortification at a pH not within the preferred range. For example, to avoid browning the bran of wheat, fortification is advantageously accomplished at pH 10.5.

Without wishing to be bound to any particular theory, it is believed that the desirability of an alkaline environment can be explained on the basis that the amino acid partially reacts within the reactive sites of the endosperm by the Maillard reaction. This mechanism involves an initial reaction between a free amino group and a carbonyl group to form an intermediate product which, in turn, undergoes dehydration to form an imine type Schiff base and incidental side products. The reaction, commonly known as Maillard browning, is strongly influenced by pH. Under alkaline condition, the amino acid becomes negatively charged and migrates to abstract a proton, but the amino group in the amino acid remains as $-NH_2$ for further Maillard reaction. However, under acidic conditions, the amino group is positively charged and is converted into $-NH_3+$ which slows or retards further Maillard reaction.

Thus, alkaline conditions are necessary for significant fortification to occur, and strongly alkaline conditions are preferred. The alkalinity, in the preferred embodiment hereof, is achieved by including in the solvent sufficient ammonium hydroxide to maintain the pH above 8 and preferably above 12. In fact, an excess of ammonium hydroxide is desirable, particularly where tempering is to be accomplished at high temperatures and/or for long periods of time and loss of some ammonium hydroxide by evaporation appears possible. It has been found that a desirable excess of ammonium hydroxide is always present when there is 10-15 per cent ammonium hydroxide present based on the volume of the aqueous solvent containing the amino acid and the untempered food, food product and/or feed.

In a properly alkaline environment, the degree of fortification attainable is essentially proportional to the amount of amino acid present in the solvent. Thus, the amino acid to be added to the solvent may comprise from 0.05 to 20 per cent by weight of the vegetable protein containing food, food product and/or feed. The amino acid may be added in any readily available, water soluble form, such as in powder form. For example, lysine is typically added as the white powder lysine-hydrochloride. It is noteworthy in connection with the amount of amino acid to be added that in order to assure the desired extent of fortification, it is preferred, although not necessary, that the amino acid be present in the tempering solvent in an excess of at least 0.1 per cent. The most preferred level of fortification for lysine is in the range from about 0.1 to 0.15 per cent by weight of the product.

As hereinbefore indicated, the tempering time-temperature relationship influences the rate of fortification rather than the extent of fortification. Thus, at higher temperatures, in the range from about 150°–300°F. fortification may be completed in as little as 15 minutes to 5 hours. At lower temperatures, such as at room temperature, fortification may require tempering for as long as 1 to 75 hours. Preferably, tempering is accomplished at temperatures in the range from about room temperature to about 250°F. Elevated tempering temperatures (and extended mixing times) appear to be needed only for those vegetable protein products having a relatively tough bran layer, such as wheat, for uniform and efficient infusion of the amino acid solution into the endosperm. This is not the case with soy products, for example, which do not have a tough bran layer.

The degree of fortification, as well as the rate thereof, is only slightly responsive to other process conditions. For example, the amount of tempering solvent used may affect the efficiency of fortification. Low volumes of tempering solvent yield non-uniform fortification. Larger volumes of solvent may show a loss of amino acid in the tempering solvent. Thus, tempering solvent volume is generally adjusted on the basis of economics and criteria of uniformity. Where wheat is the food product being fortified, it has been found that a ratio of about one part by weight water for each four parts by weight wheat produces an efficient tempering solvent. Another variable which has been found to have little, if any, influence on the fortification process is the moisture in the wheat kernel. Thus, the moisture content during tempering can vary all the way up to saturation levels, which, for wheat, is a maximum of 55 percent by weight. Most preferred moisture content for the wheat kernel or product during tempering is between about 20 to 25 per cent by weight.

Following tempering of the wheat kernel in a pH 8 – 14 solvent containing sufficient lysine, and at a temperature and for a time sufficient, to achieve the degree of fortification desired, the fortified product should be dried and moderately heated for a short time to improve handling characteristics, to stop microbial growth due to excess moisture in the endosperm and to enhance the shelf life of the product in storage. Air drying at room temperature overnight followed by heating at about 70°C for about thirty minutes has been found to be sufficient to adequately reduce the moisture level in the product. It will be appreciated by those skilled in the art, however, that any well known techniques for drying and removing excess moisture from food products, such as vacuum drying, will be suitable for use herein in lieu of the aforementioned air drying and moderate temperature heating.

In order to demonstrate the effectiveness of the present process, vegetable protein foods, food products and/or feeds were fortified in a tempering solvent containing representative amino acids under various pH and temperature conditions. Following fortification, the products were dried, excess moisture expelled and the increase in protein content estimated by Kjeldahl method. It is believed that the per cent protein increase is a fair measure of the extent of fortification. As will be appreciated by those skilled in the art, the precise determination of the amount of amino acid, such as lysine, present in fortified wheat is a major research problem. This is particularly true in accordance with the product of the present process wherein a portion of the lysine is reacted with the reactive sites of the endosperm in the wheat kernel and is not present as free lysine hydrochloride.

The following examples are presented as illustrative of the practice of the present invention:

EXAMPLE I

One thousand grams of hard red winter wheat was tempered with 350 g. of water containing 100 g. of dissolved lysine hydrochloride. The tempering solvent (pH 7) was heated at 160°F. and tempering was continued for 3 hours with occasional mixing of the solvent. The lysine fortified wheat product was air-dried overnight and heated at 70°C for 30 minutes.

To wash the fortified product, 100 g. of the fortified wheat was swirled for one-half minute in 1000 g. of water at 25°C and allowed to settle for one-half minute, after which the water was decanted.

ANALYSIS:

The fortified product showed a white coating of lysine over the wheat kernel. After washing, almost all of the lysine added had been washed away.

EXAMPLE II

One thousand grams of hard red winter wheat was tempered with 250 g. of water containing 20 g. of ammonium hydroxide and 100 g. of lysine hydrochloride. The pH of the tempering solvent was occasionally checked and maintained at all times in excess of 12. Uniform tempering was achieved by occasional mixing at room temperature for 50 hours. The tempered lysine-fortified wheat was air-dried overnight and heated at 70°C for thirty minutes. The lysine-fortified wheat was then washed with water in accordance with the procedure set forth in Example I.

| Analysis: | Per Cent Protein |
|---|---|
| Whole Wheat Kernel (starting material) | 11.7 |
| Fortified Whole Wheat Kernel (before washing) | 23.3 |
| Fortified Whole Wheat Kernel (after washing) | 22.0 |

EXAMPLE III

One thousand grams of hard red winter wheat was tempered with 250 g. of water containing 20 g. of ammonium hydroxide and 100 g. of lysine hydrochloride. The pH of the tempering solvent was intermittently checked and maintained above 12. Uniform tempering was achieved by mixing the reactants in a stainless steel container and heating in a steam autoclave at 210°F. for one hour with occasional mixing. The tempered lysine fortified wheat was air-dried overnight and heated at 70°C for thirty minutes. The lysine fortified wheat was then washed with water in accordance with the procedure set forth in Example I.

| Analysis: | Per Cent Protein |
|---|---|
| Whole Wheat Kernel (starting material) | 11.7 |
| Fortified Whole Wheat Kernel (before washing) | 18.5 |
| Fortified Whole Wheat Kernel (after washing) | 17.4 |

EXAMPLE IV

One hundred grams of hard red winter wheat was tempered with 45 g. of water containing 5 g. of ammonium hydroxide and 7 g. of lysine hydrochloride. The pH of the tempering solvent was maintained above pH 12.00. Uniform tempering was achieved by mixing the reactants in a stainless steel container and heating in a steam autoclave at 210°–212°F. for 45 minutes with occasional mixing. The fortified wheat was air-dried overnight and heated at 70°C for thirty minutes, following which it was washed with water in accordance with the procedure set forth in Example I.

| Analysis: | Per Cent Protein |
|---|---|
| Whole Wheat Kernel (starting material) | 11.7 |
| Fortified Whole Wheat Kernel (before washing) | 26.5 |
| Fortified Whole Wheat Kernel (after washing) | 25.67 |

EXAMPLE V

One hundred grams of hard red winter wheat was tempered with 50 g. of water containing 2 g. of ammonium hydroxide and 10 g. of lysine hydrochloride. The pH of the tempering solvent was adjusted to 8.5 before reaction. Uniform tempering was achieved by mixing the reactants in a stainless steel container and heating in a steam autoclave at 210°–212°F. for 45 minutes with occasional mixing. The fortified wheat was air-dried overnight and heated at 70°C for thirty minutes, following which it was washed with water in accordance with the procedure set forth in Example I.

| Analysis: | Per Cent Protein |
|---|---|
| Whole Wheat Kernel (starting material) | 11.7 |
| Fortified Whole Wheat Kernel (before washing) | 27.9 |
| Fortified Whole Wheat Kernel (after washing) | 21.9 |
| The fortified wheat showed some loss of amino acid after washing. | |

The fortified wheat showed some loss of amino acid after washing.

EXAMPLE VI

Ground gluten was dispersed in ammonium hydroxide solution having a pH in the range of 10.5 – 11. An amount of lysine hydrochloride powder equivalent to 2 per cent by weight based on the weight of the gluten was added to the ammonium hydroxide solution. Uniform fortification was achieved by occasional mixing at room temperature for 3 hours. An analysis of the resulting lysine-fortified gluten, after vacuum-drying, showed that uniform fortification had been achieved.

EXAMPLE VII

One thousand grams of hard red winter wheat was tempered with 250 g. of water containing 25 g. of ammonium hydroxide and 100 g. dissolved DL-Methionine. The pH of the tempering solvent was intermittently checked and maintained in the range of 13 – 14 throughout the tempering. Uniform tempering was achieved by occasional mixing in a sealed container at room temperature for 50 hours. The tempered methionine fortified wheat was air-dried overnight and heated at 70°C for 30 minutes. The methionine fortified wheat was then washed with water in accordance with the procedure set forth in Example I.

| Analysis: | Per Cent Protein |
|---|---|
| Whole Wheat Kernel (starting material) | 12.08 |
| Fortified Whole Wheat Kernel (before washing) | 18.06 |
| Fortified Whole Wheat Kernel (after washing) | 17.69 |

EXAMPLE VIII

One hundred grams of soy grits was tempered with 100 g. of ammoniacal solution (pH 14.00) containing 5 g. of lysine hydrochloride in a rotating jar mixer at room temperature for 1 hour. The fortified soy grits were air-dried overnight and heated at 70°C for thirty minutes, following which they were washed with water in accordance with the procedure set forth in Example I.

| Analysis: | Per Cent Protein |
|---|---|
| Soy Grits (starting material) | 58.75 |
| Fortified Soy Grits (before washing) | 64.50 |
| Fortified Soy Grits (after washing) | 63.30 |

EXAMPLE IX

One hundred grams of soy grits were tempered with 100 g. of ammoniacal solution (pH 14.00) containing 10 g. of DL-Methionine in a rotating jar mixer at room temperature for 1 hour. The fortified soy grits were air-dried overnight and heated at 70°C for 30 minutes, following which they were washed with water in accordance with the procedure set forth in Example I.

| Analysis: | Per Cent Protein |
|---|---|
| Soy Grits (starting material) | 58.75 |
| Fortified Soy Grits (before washing) | 63.9 |
| Fortified Soy Grits (after washing) | 62.8 |

EXAMPLE X

One hundred grams of soy grits were tempered with 100 g. of ammoniacal solution (pH 8.5) containing 5 g. of lysine hydrochloride in a rotating jar mixer at room temperature for 1 hour. The fortified soy grits were air-dried overnight and heated at 70°C for 30 minutes, following which they were washed with water in accordance with the procedure set forth in Example I.

| Analysis: | Per Cent Protein |
|---|---|
| Soy Grits (starting material) | 58.75 |
| Fortified Soy Grits (before washing) | 63.7 |
| Fortified Soy Grits (after washing) | 60.9 |

The fortified soy grits showed some loss of amino acid after washing.

EXAMPLE XI

One hundred grams of soy grits were tempered with 100 g. of ammoniacal solution (pH 8.5) containing 10 g. of DL-Methionine in a rotating jar mixer at room temperature for 1 hour. The fortified soy grits were air-dried overnight and heated at 70°C for 30 minutes, following which they were washed with water in accordance with the procedure set forth in Example I.

| Analysis: | Per Cent Protein |
|---|---|
| Soy grits (starting material) | 58.75 |
| Fortified Soy Grits (before washing) | 65.0 |
| Fortified Soy Grits (after washing) | 61.4 |

The fortified soy grits showed some loss of amino acid after washing.

EXAMPLE XII

One hundred grams of soy grits were tempered with 100 g. of distilled water (neutral pH) containing 10 g. of DL-Methionine in a rotating jar mixer at room temperature for 1 hour. The fortified soy grits were air-dried overnight and heated at 70°C for thirty minutes, following which they were washed with water in accordance with the procedure set forth in Example I.

| Analysis: | Per Cent Protein |
|---|---|
| Soy Grits (starting material) | 58.75 |
| Fortified Soy Grits (before washing) | 64.7 |
| Fortified Soy Grits (after washing) | 59.2 |

The fortified soy grits showed an external methionine coat and significant loss of amino acid after washing.

EXAMPLE XIII

One hundred grams of soy grits were tempered with 100 g. of ammoniacal solution (pH 14.00) containing 5 g. of lysine hydrochloride. Uniform tempering was achieved by mixing the reactants in a stainless steel container and heating in a steam autoclave at 160°–170°F. for 45 minutes with occasional mixing. The fortified soy grits were air-dried overnight and heated at 70°C for 30 minutes, following which they were washed with water in accordance with the procedure set forth in Example I.

| Analysis: | Per Cent Protein |
|---|---|
| Soy Grits (starting material) | 58.75 |
| Fortified Soy Grits (before washing) | 64.1 |
| Fortified Soy Grits (after washing) | 63.9 |

EXAMPLE XIV

One hundred grams of soy grits were tempered with 100 g. of ammoniacal solution (pH 14.00) containing 10 g. of DL-Methionine. Uniform tempering was achieved by mixing the reactants in a stainless steel container and heating in a steam autoclave at 160°–170°F. for 45 minutes with occasional mixing. The fortified soy grits were air-dried overnight and heated at 70°C for 30 minutes, following which they were washed with water in accordance with the procedure set forth in Example I.

| Analysis: | Per Cent Protein |
|---|---|
| Soy Grits (starting material) | 58.75 |
| Fortified Soy Grits (before washing) | 63.8 |
| Fortified Soy Grits (after washing) | 63.2 |

It is noteworthy from the foregoing Examples that vegetable protein fortified by the process of the present invention retains its fortification during subsequent processing in water, whereas products fortified by prior art techniques readily give up their fortification in water. The fundamental difference in the fortification achieved is in the manner in which the amino acid is associated with the vegetable protein. Prior art techniques apply nothing more than a coating to the vegetable protein. The association is only a weak mechanical linkage which is readily water-soluble — thus the fortification loss evidenced in Example I. On the other hand, the Examples show that the amino acid fortification achieved with the present process is substantially water insoluble and therefore very little is lost during subsequent water processing. This is attributable to the fact that the present process bonds the amino acid to the protein moiety. While the precise nature of the bond is not presently known, tests have indicated that the bond is somewhat akin to hydrogen bonding. More precisely, while the bond is substantially water insoluble, it is readily hydrolyzable in the presence of water to make the amino acid enrichment biologically available. This fact has been demonstrated by comparing the PER value of unfortified vegetable protein (control) and vegetable protein fortified by the process of the present invention.

Referring to Table I, nutritional data is shown for both lysine fortified wheat and methionine fortified soy products. A PER value of 1.1 was observed for the unfortified wheat control. However, the PER values for wheat fortified with 0.10 and 0.15 percent lysine by tempering in ammoniacal lysine hydrochloride solutions having pH of about 10.5 at room temperature were 1.64 and 1.83, respectively. The soy flour control PER value was observed to be 2.14. An extruded soy flour control showed a PER of 2.27, demonstrating the effect of extrusion and heat on PER. The soy controls were fortified with 1.35 percent DL-Methionine by tempering in an ammoniacal DL-Methionine solution having a pH of about 10.5 at room temperature. The unextruded soy flour PER increased to 2.58 while the extruded soy flour PER increased to 2.94 as a result of the fortification.

The data of Table I confirms that notwithstanding that the amino acid-protein bond resulting from the present process is substantially water insoluble, the bond readily hydrolyzed to release the amino acid.

TABLE I

NUTRITIONAL EVALUATION OF FORTIFIED WHEAT AND SOY PRODUCTS

| VEGETABLE PROTEIN | FORTIFICATION LEVEL (%) | AVERAGE PROTEIN CONSUMED (GMS) | AVERAGE BODY WT. GAIN (GMS) | PER |
|---|---|---|---|---|
| WHEAT (CONTROL) | 0 | 23.5 | 31.0 | 1.11 |
| WHEAT | 0.10 | 24.6 | 48.0 | 1.64 |
| WHEAT | 0.15 | 25.7 | 53.0 | 1.83 |
| SOY FLOUR (CONTROL) | — | 33.7 | 86.0 | 2.14 |
| EXTRUDED SOY FLOUR (CONTROL) | — | 33.6 | 91.0 | 2.27 |
| SOY FLOUR | 1.35 | 37.1 | 114.0 | 2.58 |
| EXTRUDED SOY FLOUR | 1.35 | 36.9 | 129.0 | 2.94 |

As hereinbefore indicated, the fortified product resulting from the present process has no undesirable flavor or aftertaste at nutritive levels of the amino acids. To demonstrate the superior taste characteristics of vegetable protein fortified by the present process a number of taste tests were conducted comparing vegetable protein products fortified by physically incorporating the amino acid with vegetable protein products fortified by the present tempering process.

EXAMPLE XV

Inasmuch as methionine is well known for its distinctive unpleasant flavor and aftertaste, taste tests in which methionine fortified soy products were incorporated into cookies in varying concentrations were conducted. For these tests a taste panel was chosen based upon their ability to identify methionine flavor in cookies.

Five types of cookie samples were prepared from the following formulation using the below described procedure, each sample differing only in the methionine concentration in the soy protein isolate. In each case, methionine was added by physical admixture with the soy.

| Sample I | Control (No methionine added) |
|---|---|
| Sample II | 0.5% methionine |
| Sample III | 1.0% methionine |
| SAMPLE IV | 1.5% methionine |
| Sample V | 2.0% methionine |

Formulation
| Soy Protein Isolate | 100 gms. |
|---|---|
| Wheat Flour (cake) | 26 gms. |
| Baking Soda | 4.5 gms. |
| Salt | 4.5 gms. |
| Shortening | 100 gms. |
| Sugar | 150 gms. |
| Water | 50 ml. |
| Eggs | 2 |

Procedure

1. Cream shortening and sugar.
2. Add eggs.
3. Add water. Mix.
4. Combine dry ingredients and add to creamed mixture.
5. Drop by teaspoon onto greased cookie sheet.
6. Press with floured fork as for peanut butter cookies.
7. Bake at 375°F. for 15–18 minutes.

Each potential panelist was given an identified cookie of each sample to become aware of the methionine flavor and odor. Some hours later, each panelist was given ten unidentified cookies selected from Samples I and II in random order for the taste test. Similarly, each panelist was given ten unidentified cookies selected from Samples I and III in random order for the smell test. The panelists were asked to record whether each cookie was made with or without methionine. Only panelists getting at least 80% correct on the taste test were used for the comparative tests to follow.

EXAMPLE XVI

Cookies were prepared from the following formulation by the procedure set forth below.

Formulation
| Soy Product | 100 gms. |
|---|---|
| Cake Flour | 26 gms. |
| Baking Soda | 4.5 gms. |
| Salt | 4.5 gms. |
| Shortening | 100 gms. |
| Granulated Sugar | 150 gms. |
| Eggs | 2 |
| Water | 80 ml. |

Procedure

1. Combine soy product, cake flour, baking soda, and salt.
2. Cream shortening and sugar thoroughly in mixer set on medium speed.
3. Add eggs. Mix.
4. Add water. Mix using low speed.
5. Add dry ingredients. Mix on low speed.
6. Drop by teaspoon onto greased cookie sheet.
7. Bake in preheated oven - 375°F.
8. Time: 18 minutes.
9. Cool.

10. Conduct preference taste test for flavor and aftertaste.

Soy flour, soy protein concentrate and soy protein isolate were each used as the soy product in the formulation. One-third of the cookies contained no DL-Methionine (control); one-third had 1.5 percent DL-Methionine by weight of the soy fortified into the soy product by physical admixture; and one-third had 1.5 percent DL-Methionine by weight of the soy fortified into the soy product by tempering in an ammoniacal methionine solution at room temperature at a pH above 10.5 with uniform, continuous mixing, in accordance with the present invention.

The test panel members were each given a cookie from the control group, a cookie fortified by physical admixture, and a cookie fortified by tempering, in random order, and were asked to rank the cookies one, two and three in decreasing order of preference according to flavor and aftertaste. The results are set forth below:

Soy Flour Cookies

1st — Control
2nd — Fortified by tempering
3rd — Fortified by physical mix

Soy Protein Concentrate Cookies

1st — Control
2nd — Fortified by tempering
3rd — Fortified by physical mix

Soy Protein Isolate Cookies

1st — Control
2nd — Fortified by tempering
3rd — Fortified by physical mix

In each case the control cookie was ranked significantly better than the cookie fortified by physical mixing but not significantly better than the cookie fortified by tempering.

EXAMPLE XVII

The tests of Example XVI were repeated except that the soy products were fortified with 0.5 percent DL-Methionine (generally the required level of methionine fortification in food products) instead of 1.5 percent DL-Methionine. The rankings for each of the soy flour, soy protein concentrate and soy protein isolate cookies were precisely the same as in Example XVI. Again, the control cookie was ranked significantly better than the cookie fortified by physical mixing but not significantly better than the cookie fortified by tempering. In fact, at this fortification level, the panelists noted that there was very little difference between the control cookie and the cookie fortified by tempering and that distinguishing between the two was difficult.

EXAMPLE XVIII

Lysine was used to fortify wheat flour by physical admixture and by tempering at a pH above 10.5 in ammoniacal lysine hydrochloride at room temperature, in accordance with the present invention. The fortified wheat flours (fortified with 1 percent lysine by weight of the flour) and an unfortified control wheat flour were used to prepare cookies from the following formulation using the procedure described below.

| Formulation | |
|---|---|
| Wheat Flour | 240 gms. |
| Baking Powder | 6 gms. |
| Salt | 2 gms. |
| Shortening | 123 gms. |
| Granulated Sugar | 75 gms. |
| Vanilla | 1/2 teaspoon |
| Milk | 30 ml. |
| Egg | 1 |

Procedure

1. Sift together flour, baking powder, and salt.
2. Thoroughly cream shortening, sugar, and vanilla.
3. Add egg, beat until light and fluffy.
4. Stir in milk.
5. Blend dry ingredients into creamed mixture.
6. Form into 1-inch balls; place two inches apart on greased cookie sheet.
7. Press crisscross with fork tines.
8. Bake in preheated oven at 375°F.
9. Time: 15 minutes.
10. Remove from cookie sheet and cool.
11. Conduct preference taste test.

Each panel member was given one each of the cookies made from the control flour, the flour fortified by physical mixing and the flour fortified by tempering, in random order, and asked to rate the cookies as excellent, good, fair, poor or very poor according to flavor and aftertaste.

The panel members could detect no significant difference between the control cookie and the cookie fortified by tempering. However, both the control cookie and the cookie fortified by tempering were rated as significantly better than the cookie fortified by physical mixing.

EXAMPLE XIX

Fortified cookies containing 1.5 percent DL-Methionine were prepared in the same manner as set forth in Example XVI. One cookie fortified by physical mixing and one cookie fortified by tempering were given to each panelist in random order. The panelists were asked to numerically rank the cookies based upon flavor and aftertaste as follows:

+2 Excellent; +1 Good; 0 Fair; −1 Poor; −2 Very Poor.

The ratings of all panelists for each cookie were averaged and are set forth below:

Soy Flour Cookies (1.5 Percent Methionine)

Fortified by tempering +0.14
Fortified by physical mix −1.81

Soy Protein Concentrate Cookies (1.5 Percent Methionine)

Fortified by tempering +0.40
Fortified by physical mix −1.85

Soy Protein Isolate Cookies (1.5 Percent Methionine)

Fortified by tempering +0.00
Fortified by physical mix −1.65

To properly evaluate these ratings, it should be appreciated that high protein cookies made from the formulation of Example XVI are known to be poor tasting cookies even without fortification. Thus, the unfortified control cookies from Example XVI were only accorded ratings in the range +1.1 to +1.3. The ratings clearly indicate the marked flavor and aftertaste superiority of cookies made from soy products fortified by tempering in accordance with the present invention compared with cookies made from soy products fortified by conventional physical admixture.

EXAMPLE XX

Fortified cookies containing 0.5 percent DL-Methionine were prepared in the same manner as set forth in Example XVII and the rating procedure set forth in Examiner XIX was used to compare the fortified cookies. The average ratings for each cookie are set forth below.

Soy Flour Cookies (0.5 Percent Methionine)

Fortified by tempering +0.25
Fortified by physical mix −1.42

Soy Protein Concentrate Cookies (0.5 Percent Methionine)

Fortified by tempering +0.583
Fortified by physical mix −1.833

Soy Protein Isolate Cookies (0.5 Percent Methionine)

Fortified by tempering −0.357
Fortified by physical mix −1.570

While the present invention has been described with respect to particular embodiments thereof, it will be understood that numerous modifications may be made by those skilled in the art without actually departing from the scope of the invention.

What is claimed as new is as follows:

1. A process for fortifying vegetable protein food products for human and animal consumption with amino acids comprising the steps of:
   a. tempering said products in an aqueous solvent having a pH in the range from about 8 to 14 for a time sufficient to achieve the desired amino acid fortification, said solvent containing an alkaline catalyst and from 0.05 to 20 percent by weight of said amino acid based upon the weight of the untempered product, and
   b. drying said tempered product to reduce the moisture level thereof.

2. A process, as claimed in claim 1, wherein said tempering is accomplished at a temperature in the range from about room temperature to about 300°F.

3. A process, as claimed in claim 2, wherein said alkaline catalyst is a mild amine-type catalyst.

4. A process, as claimed in claim 3, wherein said catalyst is ammonium hydroxide.

5. A process, as claimed in claim 3, wherein said solvent pH is at least about 10.5.

6. A process, as claimed in claim 5, wherein said solvent pH is in the range from about 12 to 14.

7. A process, as claimed in claim 5, wherein said solvent includes about 0.1 to 0.15 percent by weight amino acid.

8. A process, as claimed in claim 7, wherein said amino acid is selected from the essential amino acids.

9. A process, as claimed in claim 8, wherein said amino acid is selected from the group consisting of lysine and methionine.

10. A process, as claimed in claim 9, wherein said amino acid is lysine.

11. A process, as claimed in claim 5, wherein said tempering is accomplished at a temperature in the range from about room temperature to about 250°F.

12. A process, as claimed in claim 11, wherein said tempering is accomplished at a temperature in the range from about 160° to 170°F.

13. A process, as claimed in claim 11, wherein said solvent is mixed during tempering.

14. A process, as claimed in claim 5, wherein said solvent contains 10 to 15 per cent ammonium hydroxide by volume based upon the volume of the aqueous amino acid-untempered product solution.

15. A process, as claimed in claim 1, wherein said drying is accomplished by air drying and moderate temperature heating of said tempered product.

16. A process for fortifying vegetable protein food products for human and animal consumption with amino acids comprising tempering said products in an aqueous amino acid solution having a pH range from about 8 to 14 containing 0.05 − 20 per cent by weight amino acid based upon the weight of the untempered products.

17. A process, as claimed in claim 16, wherein said tempering is accomplished at a temperature in the range from about room temperature to about 300°F.

18. A process, as claimed in claim 17, wherein said pH is achieved by addition of ammonium hydroxide to said solvent.

19. A process as claimed in claim 18, wherein said solvent pH is at least about 10.5.

20. A process, as claimed in claim 19, wherein said solvent pH is in the range from about 12 − 14.

21. A process, as claimed in claim 19, wherein the untempered product is selected from wheat and soy and said amino acid is selected from the group consisting of lysine and methionine.

* * * * *